(12) United States Patent
Feng et al.

(10) Patent No.: US 11,800,199 B2
(45) Date of Patent: Oct. 24, 2023

(54) VIDEO PLAYING METHOD AND APPARATUS

(71) Applicant: Hangzhou Hikvision Digital Technology Co., Ltd., Zhejiang (CN)

(72) Inventors: Zhongjian Feng, Zhejiang (CN); Kui Li, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 424 days.

(21) Appl. No.: 17/284,998

(22) PCT Filed: Sep. 29, 2019

(86) PCT No.: PCT/CN2019/109156
§ 371 (c)(1),
(2) Date: Apr. 13, 2021

(87) PCT Pub. No.: WO2020/078207
PCT Pub. Date: Apr. 23, 2020

(65) Prior Publication Data
US 2021/0345013 A1    Nov. 4, 2021

(30) Foreign Application Priority Data

Oct. 18, 2018 (CN) .......................... 201811214952.8

(51) Int. Cl.
*H04N 21/81* (2011.01)
*G06F 8/61* (2018.01)
(Continued)

(52) U.S. Cl.
CPC ........... *H04N 21/8173* (2013.01); *G06F 8/61* (2013.01); *G06F 8/65* (2013.01); *G06V 20/46* (2022.01);
(Continued)

(58) Field of Classification Search
None
See application file for complete search history.

(56) References Cited

U.S. PATENT DOCUMENTS

| 2007/0124311 | A1* | 5/2007 | Lee | ........................... G06F 9/54 |
| 2008/0144529 | A1* | 6/2008 | McKee | ........................ H04L 9/40 370/254 |
| 2008/0178236 | A1 | 7/2008 | Hoshall | |

(Continued)

FOREIGN PATENT DOCUMENTS

| CN | 101321176 A | 12/2008 |
| CN | 103581754 A | 2/2014 |

(Continued)

*Primary Examiner* — William J Kim
(74) *Attorney, Agent, or Firm* — Bret E. Field; Bozicevic, Field & Francis LLP

(57) ABSTRACT

Provided are a video playing method and apparatus. Wherein the video playing method comprises: performing video-preprocessing on video data to be played and playing the video data obtained after the video-preprocessing by means of a main process of the Web client; in the case that the performance resource of the Web client is insufficient, creating and starting a video service process, wherein the video service process is configured to perform the video-preprocessing on video data to be played and play the video data obtained after the video-preprocessing. In the technical solution according to the embodiment in the present application, the main process of the Web client can play videos without relying on plug-ins. In the case that the performance resource of the Web client is insufficient, the video service process is used to play videos for the smoothness of video playing, which can also play videos without relying on plug-ins. Thus, videos can be played without relying on plug-ins by means of this solution.

18 Claims, 3 Drawing Sheets

Performing video-preprocessing on video data to be played and playing the video data obtained after the video-preprocessing by means of a main process of a Web client.   —S101

Creating and starting a video service process when the performance resource of the Web client is insufficient   —S102

(51) Int. Cl.
  *G06F 8/65*    (2018.01)
  *G06V 20/40*   (2022.01)
  *H04N 21/442*  (2011.01)
  *H04N 21/443*  (2011.01)

(52) U.S. Cl.
  CPC ..... *H04N 21/4424* (2013.01); *H04N 21/4431* (2013.01)

(56) References Cited

U.S. PATENT DOCUMENTS

| | | |
|---|---|---|
| 2010/0169681 A1 | 7/2010 | Wong et al. |
| 2012/0054781 A1 | 3/2012 | Tzruya et al. |
| 2012/0093398 A1 | 4/2012 | Cheng et al. |
| 2014/0052696 A1 | 2/2014 | Soroushian |
| 2014/0196050 A1* | 7/2014 | Yu .................. G06F 9/5094 718/104 |
| 2014/0314394 A1* | 10/2014 | Trautman ............ G11B 27/105 386/343 |
| 2015/0347164 A1 | 12/2015 | Li et al. |
| 2017/0302721 A1* | 10/2017 | Lee ........................ H04N 21/20 |
| 2018/0103261 A1 | 4/2018 | Sun et al. |

FOREIGN PATENT DOCUMENTS

| | | |
|---|---|---|
| CN | 104065896 A | 9/2014 |
| CN | 104361082 A | 2/2015 |
| CN | 104703032 A | 6/2015 |
| CN | 104811795 A | 7/2015 |
| CN | 107729132 A | 2/2018 |
| EP | 2493142 A1 * | 8/2012 |
| EP | 3203748 A1 | 8/2017 |
| JP | 2008146171 A * | 6/2008 |
| JP | 2011128762 A * | 6/2011 |
| JP | 2018033107 A * | 3/2018 |

* cited by examiner

VIDEO PLAYING METHOD AND APPARATUS

The present application claims the priority to a Chinese patent application No. 201811214952.8, filed with the China National Intellectual Property Administration on Oct. 18, 2018 and entitled "VIDEO PLAYING METHOD AND APPARATUS", which is incorporated herein by reference in its entirety.

TECHNICAL FIELD

The present application relates to the technical field of multimedia, and in particular, to a video playing method and apparatus.

BACKGROUND

With the development of network technology, users can use the browser to play videos online. Currently, video playing in the browser requires plug-ins. Common plug-ins include NPAPI (Netscape Plugin Application Programming Interface) plug-ins and ActiveX plug-ins. The NPAPI plug-in or ActiveX plug-in is embedded in the browser, and the plug-in receives the video data through the established long connection. After receiving the video data, the plug-in calls a decoding library and a rendering library to decode and render the video data. The video can be played in the browser after decoding and rendering.

However, after the plug-in is embedded in the browser, the plug-in will acquire higher permissions, such as monitoring web browsing records, installing malicious programs in the background, and generating pop-up windows without authorization. This leads to network security issues. Based on this, most browsers nowadays have disabled plug-ins. Therefore, how to play videos in the browser without relying on plug-ins is an urgent problem to be solved.

SUMMARY

The purpose of the embodiments of the present application is to provide a video playing method and apparatus, so as to realize that videos can be played without relying on plug-ins. The specific technical solutions are as follows.

In a first aspect, an embodiment of the present application provides a video playing method, which is applied to a Web client. The method includes:
performing video-preprocessing on video data to be played, and playing the video data obtained after the video-preprocessing by means of a main process of the Web client;
creating and starting a video service process when the performance resource of the Web client is insufficient, wherein the video service process is configured to perform the video-preprocessing on video data to be played and play the video data obtained after the video-preprocessing.

In a second aspect, an embodiment of the present application provides a video playing apparatus, which is applied to a Web client. The apparatus includes:
a processing module, configured for performing video-preprocessing on video data to be played and playing the video data obtained after the video-preprocessing by means of a main process of the Web client;
a creation module, configured for creating and starting a video service process when the performance resource of the Web client is insufficient, wherein the video service process is configured to perform the video-preprocessing on video data to be played and play the video data obtained after the video-preprocessing.

In a third aspect, an embodiment of the present application provides an electronic device including a processor, a communication interface, a memory and a communication bus, wherein the processor, the communication interface, and the memory are communicated with each other via the communication bus;
the memory is used for storing computer programs;
the processor is used for implementing steps of any video playing method described above when executing the programs stored on the memory.

In a fourth aspect, an embodiment of the present application provides a machine readable storage medium. The machine readable storage medium stores computer programs thereon which, when executed by a processor, cause the processor to implement the steps of any video playing method described above.

In a fifth aspect, an embodiment of the present application provides a computer program product, which implements the steps of any video playing method described above when executed by a processor.

In the technical solutions provided in the embodiments of this application, the main process of the Web client performs video-preprocessing on video data to be played and plays the video data obtained after the video-preprocessing; and creates and starts a video service process when the performance resource of the Web client is insufficient. Wherein the video service process is configured to perform the video-preprocessing on video data to be played and play the video data obtained after the video-preprocessing. In the technical solution according to the embodiment in the present application, the main process of the Web client can play videos without relying on plug-ins. When the performance resource of the Web client is insufficient, the video service process is used to play videos for the smoothness of video playing, which can also play videos without relying on plug-ins. Thus, videos can be played without relying on plug-ins by means of this solution.

BRIEF DESCRIPTION OF THE DRAWINGS

In order to more clearly describe the technical solutions of the embodiments of the present application and the prior art, drawings needed in the embodiments and the prior art will be briefly described below. Obviously, the drawings described below are only some embodiments of the present application, those of ordinary skills in the art can also obtain other drawings based on these drawings without any creative efforts.

DETAILED DESCRIPTION

In order to make objectives, technical solutions and advantages of the present application more apparent, the present application now will be described in detail with reference to the accompanying drawings and by way of examples. Obviously, the embodiments described are only some, rather than all, of the embodiments of the present application. All other embodiments obtained by those of ordinary skills in the art based on the embodiments herein without any creative efforts are within the scope of the present application.

In order to play videos without relying on plug-ins, embodiments of the present application provide a video playing method and apparatus. Wherein the video playing method includes:

performing video-preprocessing on video data to be played and playing the video data obtained after the video-preprocessing by means of a main process of the Web client;

creating and starting a video service process when the performance resource of the Web client is insufficient, wherein the video service process is configured to perform the video-preprocessing on video data to be played and play the video data obtained after the video-preprocessing.

In the technical solution according to the embodiment in the present application, the main process of the Web client can play videos without relying on plug-ins. When the performance resource of the Web client is insufficient, the video service process is used to play videos for the smoothness of video playing, which can also play videos without relying on plug-ins. Thus, videos can be played without relying on plug-ins by means of this solution.

A video playing method according to an embodiment of the present application will be described below. The video playing method according to the embodiment of this application can be applied to a Web client. Wherein the Web client may be a Web page in an application. For example, the Web client may be a Web page in a browser, through which videos can be played by the user. The web client may also be a Web page in other applications that can provide Web functions, which will not be repeated here.

Figure 1:
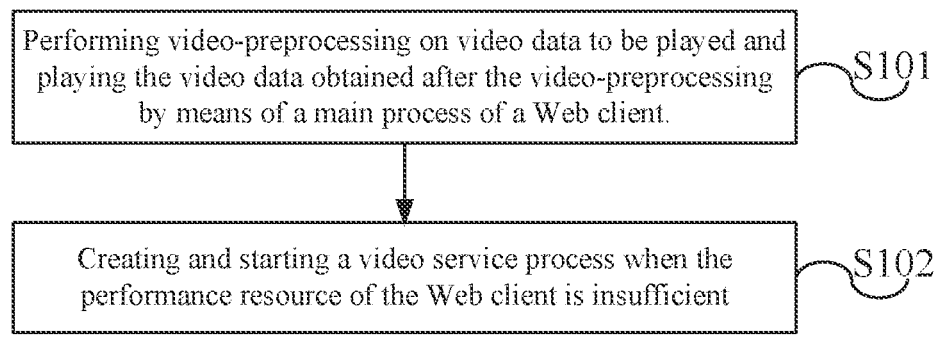
FIG. 1 is a flowchart of a video playing method according to an embodiment of the present application.

As shown in FIG. 1, a video playing method according to an embodiment of the present application includes the following steps:

At S101, performing video-preprocessing on video data to be played, and playing the video data obtained after the video-preprocessing by means of a main process of the Web client.

Wherein the main process of the Web client is a process created by the Web client itself, and playing videos through the Web client can be realized by the main process of the Web client.

The video-preprocessing of the video data includes at least one of decapsulation processing, decoding processing, rendering processing and the like. The video-preprocessing may also include other video processing methods, which are not limited here.

In one implementation, the main process of the Web client can acquire the video data to be played.

Wherein, the video data to be played can be determined according to user instructions. For example, the Web client is a browser client, the user uses the browser to browse a video website and clicks a link of video "a" on the video website. At this time, the video "a" is determined as the video to be played, and the Web client can acquire an instruction to play the video "a".

In one implementation, the main process of the Web client can acquire the video data to be played from a server. Wherein, the Web client can communicate with the server through a WebSocket protocol. There are at least two ways for the main process to acquire the video data from a server.

In the first way, the server can actively send the video data to be played to the main process of the Web client. Wherein the server can determine, based on the frame rate and code rate of the acquired video data, the rate at which the video data is sent to the Web client.

In the second way, the Web client can acquire the video data to be played from the server by calling a WebSocket callback function.

The way the main process of the Web client acquires the video data from the server is not limited to the above two mays, and may also include other acquiring methods, which are not limited here.

Wherein the main process of the Web client may acquire the video data from the server continuously, or may acquire all the video data at one or more times.

After acquiring the video data to be played, the main process of the Web client can decapsulate the acquired video data.

In one implementation, the main process of the Web client can decapsulate the acquired video data through a Javascript/WASM (WebAssembly). Wherein WASM runs in a sandboxed execution environment and can be implemented in the existing JavaScript virtual machine. The WebAssembly can be called by the JavaScript and enter the context of the JavaScript, so as to realize the decapsulation processing of the acquired video data.

After completing the decapsulation processing, the main process of the Web client may decode the decapsulated video data.

In one implementation, the main process of the Web client can perform decoding processing on the decapsulated video data through the Javascript/WASM. Wherein in order to prevent a large amount of undecoded video data in the main process from causing too heavy load on the main process, the main process of the Web client can monitor the amount of currently undecoded video data in the main process.

After completing the decoding process, the main process of the Web client may perform rendering processing on the video data obtained after the decoding processing, and play the rendered video data.

In one implementation, the main process of the Web client can perform rendering processing on the decoded video data through a WebGL (Web Graphics Library) rendering. Wherein the WebGL is a 3D (three-dimensional) drawing protocol. The WebGL can provide 3D accelerated rendering, so that the main process of the Web client can display 3D scenes and models more smoothly.

The main process of the Web client can play videos without relying on plug-ins. The main process performs video-preprocessing on and plays video data to be played, and thus videos can be played without relying on plug-ins.

At S102, creating and starting a video service process when the performance resource of the Web client is insufficient.

Wherein the video service process is configured to perform the video-preprocessing on video data to be played and play the video data obtained after the video-preprocessing.

After the video service process is created and started, a connection is established between the main process and the video service process. After connected with the main process of the Web client, the video service process can receive instructions issued by the main process and perform corresponding operations.

After a connection is established between the main process and the video service process, the video service process may perform the video-preprocessing on video data to be played, and play video data obtained after the video-preprocessing.

In one implementation, the main process of the Web client sends a video playing instruction to the video service process after receiving the video playing instruction. The video service process can create a video window after receiving the video playing instruction. The video window is a window for displaying the played video, that is, the video is played in the video window.

The created video window is displayed in an interface of a running Web client. For example, when the Web client is a browser client, the video window is displayed in the interface where the current window of the browser is located. In addition, the video window can change as the interface of the running Web client changes. For example, when the interface of the running Web client is stretched, the video window is stretched according to a certain ratio; when the interface of the running Web client moves, the video window moves in the moving direction of the interface. In this way, the effect that the video window is embedded in the interface of a running Web client can be achieved.

After creating the video window, the video service process acquires the video data to be played according to the video playing instruction. Wherein the video service process can acquire the video data to be played from the server. There are at least two ways for the video service process to obtain video data from the server. In the first way, the server can actively send the video data to be played to the video service process. In the second way, the video service can acquire the video data to be played from the server by calling a WebSocket callback function.

The way the video service process acquires the video data from the server is not limited to the above two ways, and may also include other acquiring methods, which are not limited here.

After acquiring the video data to be played, the video service process can perform decapsulation processing on the acquired video data. After the decapsulation processing is completed, the decapsulated video data is decoded. After the decoding process is completed, the video service process renders the decoded video data, and plays the rendered video data in the video window.

Wherein, the process of decapsulation processing, decoding processing, and rendering processing performed by the video service process is similar to that of decapsulation processing, decoding processing, and rendering processing performed by the main process of the Web client, and will not be repeated here.

Wherein, the video service process may be a process created by programs, other than the Web client, to perform the video-preprocessing on video data. For example, the video service process may be a process created by an installed application, or a process created by a system itself, the system is a system run by a device in which a Web client is installed.

In one implementation, when the performance resource of the Web client is insufficient, the Web client may also prompt the user to choose whether to create a video service process.

Wherein, the prompt may be realized using at least one of a text prompt, a voice prompt, an image prompt, and the like. In one implementation, when there is a display screen for the Web client, the prompt can be displayed in text on the display screen. And two buttons are displayed on the display screen for the user to choose, one indicating the creation of a video service process, and the other indicating no creation of a video service process.

In the case that the user chooses to create a video service process, the Web client creates and starts the video service process, and establishes a connection between the video service process and the main process.

In one implementation, in the case that the user chooses not to create a video service process, the video data to be played may be subjected to a frame-extraction-processing. Wherein in one implementation of the frame-extraction-processing, the frame-extraction-processing can be performed on the video data to be played according to a preset frame extraction rule.

Wherein the preset frame extraction rule can be customized. In one implementation, the frame extraction rule may be that a second number of frame images are extracted every other first number of frame images. Wherein both the first number and the second number can be customized. For example, the first number is 5 and the second number is 1, and the preset frame extraction rule is to extract 1 frame image every other 5 frame images.

After the frame-extraction-processing is completed, the main process performs the video-preprocessing on the video data obtained after the frame-extraction-processing, and plays the video data obtained after the video-preprocessing.

Through this implementation, after the frame-extraction-processing, the number of frame images on which the main process performs the video-preprocessing in a unit time will be reduced, and the load pressure of the main process will be reduced, so that in the unit time, the main process can complete the video-preprocessing on a reduced certain number of frame images, which leads to smooth video playing.

In one implementation, the above step of creating and starting the video service process (S102) may include the following steps.

An installation package of the video service process is acquired and installed. Wherein the installation package of the video service process can be pre-stored in the Web client. In this way, the Web client can directly acquire the installation package locally and install the installation package.

After the installation is completed, it can be considered that the creation of the video service process is successful, and then the video service process is started, and a connection between the video service process and the main process is established.

In one implementation, insufficient performance resource of the Web client may lead to a decline in the processing capability of the main process of the Web client and delayed playing of the video data processed by the main process, which affects the user experience. In order to reduce the occurrence frequency of this phenomenon and make the video playing smooth, the Web client can monitor the performance resource to determine whether the performance resource of Web client is insufficient.

When it is determined that the performance resource of the Web client is sufficient, the main process of the Web client can continue to perform the video-preprocessing on the video data to be played and play the video data obtained after the video-preprocessing. When it is determined that the performance resource of the Web client is insufficient, the above step S102 is executed.

In one implementation, when the performance resource of the Web client is insufficient, before the step of creating and starting the video service process (step S102), the following steps may also be included.

At step 1, the Web client can acquire the duration of performing the video-preprocessing on a video frame that has been subjected to the video-preprocessing in the video data.

Wherein the video data acquired by the main process of the Web client may include several frames of image, and each frame image is sorted according to the time sequence of playing. The main process of the Web client performs the video-preprocessing on each frame image according to the sequence of the frame images.

For example, the video data includes N frames of image, and the sequence of the N frames of image is: the first frame image, the second frame image . . . the Nth frame image. After the main process of the Web client obtains the video data, it performs video-preprocessing on firstly the first frame image, then the second frame image, and finally the Nth frame image.

The duration of the main process performing the video-preprocessing on each frame image can be the same or different. For example, when the performance resource of the Web client is sufficient, the duration of the main process performing the video-preprocessing on each frame image is short; when the performance resource of the Web client is insufficient, the duration of the main process performing the video-preprocessing on each frame image is long.

When the main process performs the video-preprocessing on each frame image, the Web client can record the duration of performing the video-preprocessing on each frame image. In this way, the duration of performing the video-preprocessing on each frame image that has been subjected to the video-preprocessing is recoded in the Web client. The Web client can directly acquire the duration, that is, it can acquire the duration of performing the video-preprocessing on the frame image that has been subjected to the video-preprocessing.

At step 2, calculating the total duration of performing the video-preprocessing on continuous frame images based on the duration of performing the video-preprocessing on the acquired frame image and the preset number of the continuous frame images.

Wherein the preset number can be customized. For example, it is generally considered that when playing a video, it is a normal playing speed to play 25 frame images in 1 second, and when the number of frame images played in 1 second is less than 25, the playing delay will occur. Therefore, the preset number can be set to 25.

The selected preset number of frame images are frame images that have been subjected to the video-preprocessing, and the selected frame images are continuous. For example, if the preset number is 25, the selected 25 consecutive frame images may be 25 consecutive images starting from the 11th frame image, that is, the 35th frame image is the last selected image.

The initial image of the selected preset number of consecutive frame images may be selected by users. Generally, in order to improve the accuracy of the judgment result, a frame image closer to the current time can be selected as the initial image.

For example, if the current time is exactly 10:00:01, the frame image subjected to the video-preprocessing in the previous second can be selected as the initial image. That is, the frame image subjected to the video-preprocessing at 10:00:00 is selected as the initial image. A preset number of consecutive frame images starting from the initial image are used as the selected images.

For the selected preset number of consecutive frame images, the duration of performing the video-preprocessing on each frame image can be acquired. The duration for each frame image is summed to obtain the total duration of performing the video-preprocessing on the continuous frame images.

For example, the preset number is 25. In the selected 25 consecutive frame images, the duration of performing the video-preprocessing on each frame image is 40 milliseconds. Then the total duration of performing the video-preprocessing on the 25 consecutive frame images is 1 second.

At step 3, determining whether the total duration is greater than a preset duration threshold; if it is greater than the preset duration threshold, determining that the performance resource of the Web client is insufficient; otherwise, determining that the performance resource of the Web client is sufficient.

Wherein the preset duration threshold can be customized. In one implementation, the preset duration threshold may be set according to the aforementioned preset number.

For example, when the aforementioned preset number is set to 25, the preset duration threshold may be set to 1 second. In this case, when the total duration corresponding to 25 frame images is greater than 1 second, it means that 25 frame images cannot be played within 1 second. At this time, it can be determined that the performance resource of the Web client is insufficient and the video playing is delayed. When the total duration corresponding to 25 frame images is not greater than 1 second, it means that 25 frame images can be played within 1 second. At this time, it can be determined that the performance resource of the Web client is sufficient and the video playing is normal.

In one implementation, the step 1 in the foregoing implementation, at which the Web client can acquire the duration of performing the video-preprocessing on the video frames that have been subjected to the video-preprocessing in the video data, may include the following steps.

At step A, the current time point is recorded as an initial time point when starting to perform the video-preprocessing on the frame images in the video data.

Wherein the object whose time point is recorded as the initial time point can be any frame image subjected to the video-preprocessing by the main process of the Web client.

In one implementation, when the Web client detects that the main process starts to perform the video-preprocessing on one frame image in the video data, the current time point is acquired as the initial time point of the frame image.

At step B, when the main process completes the video-preprocessing on the frame image, the current time point is recorded as an end time point.

The frame image for the record of the end time point and the frame image for the record of the initial time point are the same frame image. In one implementation, when the Web client detects that the main process completes the video-preprocessing on the frame image, the current time point is acquired as the end time point of the frame image.

At step C, after the initial time point and the end time point of the frame image are acquired, the duration of performing the video-preprocessing on the frame image is obtained by subtracting the initial time point from the end time point.

For example, for the frame image "a" in the video data, when the main process of the Web client starts to perform the video-preprocessing on the frame image "a", the current time point is exactly 10:00:00, and this time point is recorded as the initial time point of the frame image "a". When the main process of the Web client completes the video-preprocessing on the frame image "a", the current time point is 40 milliseconds past 10:00:00, and this time point is recorded as the end time point of the frame image "a". A duration of 40 milliseconds is obtained by subtracting the recorded initial time point from the end time point, that is, the duration of performing the video-preprocessing on the frame image "a" is 40 milliseconds.

In one implementation, when the Web client is started, the main process of the Web client will preferentially connect with the video service process. If the main process of the Web client fails to connect with the video service process, the above step S101 is executed.

Wherein the failure in the connection between the main process of the Web client and the video service process may include the following two situations. In the first case, if the video service process is not started or fails to start, the connection between the main process of the Web client and the video service process will fail. In the second case, if the video service process is not installed in the device where the web client is installed, the connection between the main process of the web client and the video service process will fail.

If the main process of the Web client is successfully connected to the video service process, the Web client is communicated with the video service process so that the video service process performs the video-preprocessing on video data to be played, and plays the video data obtained after the video-preprocessing.

In the technical solutions provided in the embodiments of this application, the main process of the Web client performs video-preprocessing on video data to be played, and plays the video data obtained after the video-preprocessing; and creates and starts a video service process when the performance resource of the Web client is insufficient. Wherein the video service process is configured to perform the video-preprocessing on video data to be played and play the video data obtained after the video-preprocessing. In the technical solution according to the embodiment in the present application, the main process of the Web client can play videos without relying on plug-ins. When the performance resource of the Web client is insufficient, the video service process is used to play the videos for the smoothness of video playing, which can also play videos without relying on plug-ins. Thus, videos can be played without relying on plug-ins by means of this solution.

Figure 2:
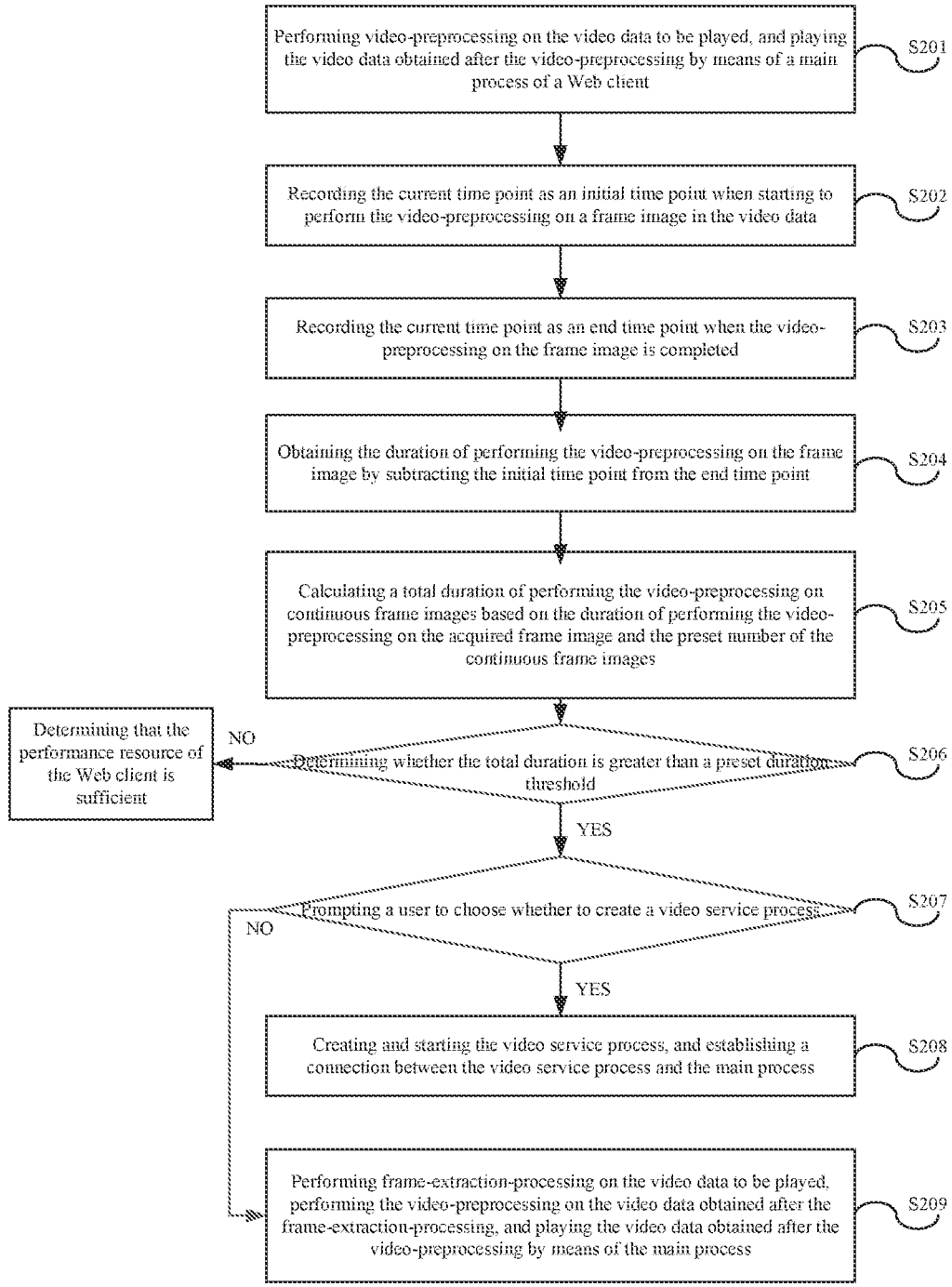
FIG. 2 is another flowchart of a video playing method according to an embodiment of the present application.

An embodiment of the present application also provides a video playing method. As shown in FIG. 2, the video playing method includes the following steps:

At S201, performing video-preprocessing on video data to be played, and playing the video data obtained after the video-preprocessing by means of a main process of the Web client;

At S202, recording the current time point as an initial time point when starting to perform the video-preprocessing on a frame image in the video data;

At S203, recording the current time point as an end time point when the video-preprocessing on the frame image is completed;

At S204, obtaining the duration of performing the video-preprocessing on the frame image by subtracting the initial time point from the end time point;

At S205, calculating a total duration of performing the video-preprocessing on continuous frame images based on the duration of performing the video-preprocessing on the acquired frame image and the preset number of the continuous frame images;

At S206, determining whether the total duration is greater than a preset duration threshold; if so, performing the step S207; otherwise, determining that the performance resource of the Web client is sufficient;

At S207, prompting a user to choose whether to create a video service process. If the user chooses to create a video service process, executing the step S208; otherwise, executing the step S209;

At S208, creating and starting the video service process, and establishing a connection between the video service process and the main process;

At S209, performing frame-extraction-processing on the video data to be played, performing the video-preprocessing on the video data obtained after the frame-extraction-processing, and playing the video data obtained after the video-preprocessing by means of the main process.

Figure 3:
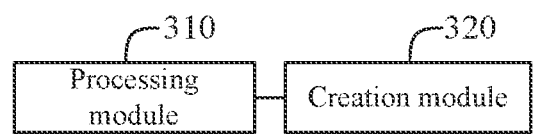
FIG. 3 is a schematic structural diagram of a video playing apparatus according to an embodiment of the present application.

Corresponding to the foregoing embodiment of the video playing method, an embodiment of the present application also provides a video playing apparatus applied to a Web client. As shown in FIG. 3, the video playing apparatus includes:

a processing module 310, configured for performing video-preprocessing on video data to be played and playing the video data obtained after the video-preprocessing by means of a main process of the Web client;

a creation module 320, configured for creating and starting a video service process when the performance resource of the Web client is insufficient, wherein the video service process is configured to perform the video-preprocessing on video data to be played and play the video data obtained after the video-preprocessing.

In one implementation, the apparatus may further include:
a prompt module, configured for prompting a user to choose whether to create a video service process;
wherein the creation module 320 is specifically configured for:
creating and starting the video service process, and establishing a connection between the video service process and the main process in the case that the user chooses to create a video service process.

In one implementation, the apparatus may further include:
a frame extraction module, configured for performing frame-extraction-processing on the video data to be played in the case that the user chooses not to create a video service process;
a preprocessing module, configured for performing the video-preprocessing on the video data obtained after the frame-extraction-processing, and playing the video data obtained after the video-preprocessing by means of the main process.

In one implementation, the creation module 320 is specifically used for:
acquiring and installing an installation package of the video service process;
starting the video service process, and establishing a connection between the video service process and the main process after the installation is completed.

In one implementation, the apparatus may further include:
an acquisition module, configured for acquiring the duration of performing the video-preprocessing on the frame image that has been subjected to the video-preprocessing in the video data;
a calculation module, configured for calculating the total duration of performing the video-preprocessing on continuous frame images based on the duration of performing the video-preprocessing on the acquired frame image and the preset number of the continuous frame images;

a judgment module, configured for determining whether the total duration is greater than a preset duration threshold; if it is greater than the preset duration threshold, determining that the performance resource of the Web client is insufficient; otherwise, determining that the performance resource of the Web client is sufficient.

In one implementation, the acquisition module is specifically configured for:

recording the current time point as an initial time point when starting to perform the video-preprocessing on the frame images in the video data;

recording the current time point as an end time point when the video-preprocessing on the frame image is completed;

obtaining the duration of performing the video-preprocessing on the frame image by subtracting the initial time point from the end time point.

In the technical solutions provided in the embodiments of this application, a main process of the Web client performs the video-preprocessing on video data to be played, and plays the video data obtained after the video-preprocessing; and creates and starts a video service process when the performance resource of the Web client is insufficient. Wherein the video service process is configured to perform the video-preprocessing on video data to be played and play the video data obtained after the video-preprocessing. In the technical solution according to the embodiment in the present application, the main process of the Web client can play videos without relying on plug-ins. When the performance resource of the Web client is insufficient, the video service process is used to play videos for the smoothness of video playing, which can also play videos without relying on plug-ins. Thus, videos can be played without relying on plug-ins by means of this solution.

Figure 4:
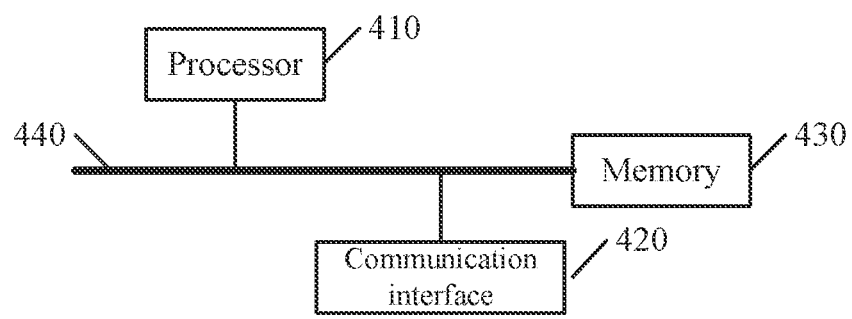
FIG. 4 is a schematic structural diagram of an electronic device according to an embodiment of the present application.

Corresponding to the embodiment of the above video playing method, an embodiment of the present application provides an electronic device, as shown in FIG. 4, which includes a processor 410, a communication interface 420, a memory 430 and a communication bus 440, wherein the processor 410, the communication interface 420 and the memory 430 are communicated with each other via the communication bus 440;

the memory 430 is used for storing computer programs;

the processor 410 is used for implementing the following steps when executing the programs stored on the memory 430:

performing the video-preprocessing on video data to be played and playing the video data obtained after the video-preprocessing by means of a main process of the Web client;

when the performance resource of the Web client is insufficient, creating and starting a video service process, wherein the video service process is configured to perform the video-preprocessing on video data to be played and play the video data obtained after the video-preprocessing.

In a possible implementation, the processor 410 may also implement any one of the foregoing video playing method when being executed by the programs stored on the memory 430.

In the technical solution according to the embodiment in the present application, the main process of the Web client can play videos without relying on plug-ins. When the performance resource of the Web client is insufficient, the video service process is used to play videos for the smoothness of video playing, which can also play videos without relying on plug-ins. Thus, videos can be played without relying on plug-ins by means of this solution.

The communication bus aforementioned in the electronic device may be a peripheral component interconnect (PCI) bus or an extended industry standard architecture (EISA) bus and the like. The communication bus can include an address bus, a data bus, a control bus, or the like. For representation, only one thick line is shown in the figure, which does not mean there is only one communication bus or one type of communication bus.

The communication interface is used for communication between the aforementioned electronic device and other devices.

The memory can include a random access memory (RAM), or can include a non-volatile memory (NVM), for example at least one disk memory. Optionally, the memory can also be at least one storage device located away from the processor described above.

The aforementioned processor can be a general-purpose processor, including a central processing unit (CPU), a network processor (NP), or the like; it can also be a digital signal processor (DSP), an application specific integrated circuit (ASIC), a field-programmable gate array (FPGA) or other programmable logic device, a discrete gate or a transistor logic device, a discrete hardware component.

Corresponding to the above embodiments of the video playing methods, an embodiment of the present application provides a machine readable storage medium. The machine readable storage medium stores computer programs thereon which, when executed by a processor, cause the processor to implement the steps of any one of the video playing methods described above.

The embodiments of the present application also provide a computer program product, which implements any one of the foregoing video playing method when being executed by a processor.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices including a series of elements include not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments in the description are described in corresponding ways, same or similar parts in each of the embodiments can be referred to one another, and the parts emphasized are differences to other embodiments. For the embodiments of the video playing apparatus, the Web client, and the machine readable storage medium, since they are similar to the embodiments of the video playing methods, the description thereof is relatively simple; the relating parts could refer to the parts of the description of embodiments of the method.

The above description is only for preferred embodiments of the present application, and is not intended to limit the present application. Any modifications, substitutions, improvements, etc., which are made within the spirit and principles of the present application, will fall into the protection scope of the present application.

What is claimed is:

1. A video playing method, wherein it is applied to a Web client and comprises:

performing video-preprocessing on video data to be played, and playing the video data obtained after the video-preprocessing by means of a main process of the Web client;

creating and starting a video service process when a performance resource of the Web client is insufficient, wherein the video service process is configured to perform the video-preprocessing on video data to be played and play the video data obtained after the video-preprocessing.

2. The method of claim 1, further comprising:

providing a prompt to choose whether to create a video service process;

creating and starting a video service process comprises:

in a case that it is chosen to create a video service process, creating and starting the video service process, and establishing a connection between the video service process and the main process.

3. The method of claim 2, further comprising:

in a case that it is chosen not to create a video service process, performing frame-extraction-processing on the video data to be played;

performing the video-preprocessing on the video data obtained after the frame-extraction-processing, and playing the video data obtained after the video-preprocessing by means of the main process.

4. The method of claim 1, wherein creating and starting a video service process comprises:

acquiring and installing an installation package of the video service process;

after the installation is completed, starting the video service process and establishing a connection between the video service process and the main process.

5. The method of claim 1, wherein before the step of creating and starting a video service process when the performance resource of the Web client is insufficient, the method further comprises:

acquiring a duration of performing the video-preprocessing on a frame image that has been subjected to the video-preprocessing in the video data;

calculating a total duration of performing the video-preprocessing on continuous frame images based on the duration of performing the video-preprocessing on the acquired frame image and a preset number of the continuous frame images;

when the total duration is greater than the preset duration threshold, determining that the performance resource of the Web client is insufficient;

when the total duration is not greater than the preset duration threshold, determining that the performance resource of the Web client is sufficient.

6. The method of claim 5, wherein the step of acquiring the duration of performing the video-preprocessing on the frame image that has been subjected to the video-preprocessing in the video data comprises:

recording a current time point as an initial time point when starting to perform the video-preprocessing on the frame image in the video data;

recording a current time point as an end time point when the video-preprocessing on the frame image is completed;

obtaining the duration of performing the video-preprocessing on the frame image by subtracting the initial time point from the end time point.

7. An electronic device, wherein it comprises a processor and a memory;

the memory is used for storing computer programs;

the processor is used for implementing the video playing method of claim 1 when executing the programs stored on the memory.

8. A non-transitory computer readable storage medium, wherein the non-transitory computer readable storage medium stores computer programs thereon which, when executed by a processor, cause the processor to implement the video playing method of claim 1.

9. The electronic device of claim 7, wherein the processor is used for further:

providing a prompt to choose whether to create a video service process;

wherein creating and starting a video service process comprises:

in a case that it is chosen to create a video service process, creating and starting the video service process, and establishing a connection between the video service process and the main process.

10. The electronic device of claim 9, wherein the processor is used for further:

in a case that it is chosen not to create a video service process, performing frame-extraction-processing on the video data to be played;

performing the video-preprocessing on the video data obtained after the frame-extraction-processing, and playing the video data obtained after the video-preprocessing by means of the main process.

11. The electronic device of claim 7, wherein creating and starting a video service process comprises:

acquiring and installing an installation package of the video service process;

after the installation is completed, starting the video service process and establishing a connection between the video service process and the main process.

12. The electronic device of claim 7, wherein before the step of creating and starting a video service process when the performance resource of the Web client is insufficient, the processor is used for further:

acquiring a duration of performing the video-preprocessing on a frame image that has been subjected to the video-preprocessing in the video data;

calculating a total duration of performing the video-preprocessing on continuous frame images based on the duration of performing the video-preprocessing on the acquired frame image and a preset number of the continuous frame images;

when the total duration is greater than the preset duration threshold, determining that the performance resource of the Web client is insufficient;

when the total duration is not greater than the preset duration threshold, determining that the performance resource of the Web client is sufficient.

13. The electronic device of claim 12, wherein the step of acquiring the duration of performing the video-preprocessing on the frame image that has been subjected to the video-preprocessing in the video data comprises:

recording a current time point as an initial time point when starting to perform the video-preprocessing on the frame image in the video data;

recording a current time point as an end time point when the video-preprocessing on the frame image is completed;

obtaining the duration of performing the video-preprocessing on the frame image by subtracting the initial time point from the end time point.

14. The non-transitory computer readable storage medium of claim 8, wherein the processor is caused to implement an operation of:
   providing a prompt to choose whether to create a video service process;
   wherein creating and starting a video service process comprises:
      in a case that it is chosen to create a video service process, creating and starting the video service process, and establishing a connection between the video service process and the main process.

15. The non-transitory computer readable storage medium of claim 14, wherein the processor is used for further:
   in a case that it is chosen not to create a video service process, performing frame-extraction-processing on the video data to be played;
      performing the video-preprocessing on the video data obtained after the frame-extraction-processing, and playing the video data obtained after the video-preprocessing by means of the main process.

16. The non-transitory computer readable storage medium of claim 8, wherein creating and starting a video service process comprises:
   acquiring and installing an installation package of the video service process;
   after the installation is completed, starting the video service process and establishing a connection between the video service process and the main process.

17. The non-transitory computer readable storage medium of claim 8, wherein before the step of creating and starting a video service process when the performance resource of the Web client is insufficient, the processor is caused to implement operations of:
   acquiring a duration of performing the video-preprocessing on a frame image that has been subjected to the video-preprocessing in the video data;
   calculating a total duration of performing the video-preprocessing on continuous frame images based on the duration of performing the video-preprocessing on the acquired frame image and a preset number of the continuous frame images;
   when the total duration is greater than the preset duration threshold, determining that the performance resource of the Web client is insufficient;
   when the total duration is not greater than the preset duration threshold, determining that the performance resource of the Web client is sufficient.

18. The non-transitory computer readable storage medium of claim 17, wherein the step of acquiring the duration of performing the video-preprocessing on the frame image that has been subjected to the video-preprocessing in the video data comprises:
   recording a current time point as an initial time point when starting to perform the video-preprocessing on the frame image in the video data;
   recording a current time point as an end time point when the video-preprocessing on the frame image is completed;
   obtaining the duration of performing the video-preprocessing on the frame image by subtracting the initial time point from the end time point.

\* \* \* \* \*